US006076090A

United States Patent [19]
Burroughs et al.

[11] Patent Number: 6,076,090
[45] Date of Patent: Jun. 13, 2000

[54] DEFAULT SCHEMA MAPPING

[75] Inventors: Tracy Kim Burroughs, Byron; Steven John Gansemer; Wilson D. Lee, both of Rochester, all of Minn.; Vance Palmer Morrison, Kirkland, Wash.; Cynthia Ann Rogers, Rochester; Laura Jane Zaborowski, Winona, both of Minn.

[73] Assignee: International Business Machines Corporation, Armonk, N.Y.

[21] Appl. No.: 08/979,250

[22] Filed: Nov. 26, 1997

[51] Int. Cl.[7] .................................................... G06F 17/30
[52] U.S. Cl. ........................................... 707/102; 707/103
[58] Field of Search .................................. 707/102, 103, 707/101

[56] References Cited

U.S. PATENT DOCUMENTS

| | | | |
|---|---|---|---|
| 5,291,583 | 3/1994 | Bapat | 707/103 |
| 5,295,256 | 3/1994 | Bapat | 707/3 |
| 5,499,371 | 3/1996 | Henninger et al. | 707/102 |
| 5,542,078 | 7/1996 | Maitel et al. | 707/101 |
| 5,613,099 | 3/1997 | Erickson et al. | 395/500 |
| 5,627,979 | 5/1997 | Chang et al. | 345/335 |
| 5,694,598 | 12/1997 | Durand et al. | 707/103 |
| 5,729,739 | 3/1998 | Cantin et al. | 707/103 |
| 5,850,544 | 12/1998 | Parvathaneny et al. | 707/101 |
| 5,873,093 | 2/1999 | Williamson et al. | 707/103 |
| 5,878,411 | 3/1999 | Burroughs et al. | 707/4 |
| 5,956,725 | 9/1999 | Burroughs et al. | 707/101 |
| 5,956,730 | 9/1999 | Burroughs et al. | 707/104 |

OTHER PUBLICATIONS

Harri Laine, "Transformation of Object Model to the Relational Schema," Information Systems Course University of Helsinki, May 10, 1997, at <http://www.cs.helsinki.fi/~laine/info/kevat 97/trans.html>.

"Java Relational Binding," A White Paper, 02 Technology, Oct., 1996, pp. 1–9, at <http://www.ootech.com.2u/javabind.doc>.

Software Tree Inc., Enjoy the Fruits, "J–Database Exchange (JDX™) White Paper", pp. 1–5, at <http://www.software-tree.com/products/jdx/whitepaper/JDX–WhitePaper1.htm> unknown.

Enabling the Integration of Object Applications with Relational Databases, by Arthur Keller, Ph.D., Richard Jensen, and Shailesh Agrawal, Ph.D., Persistence Software, Mar. 24, 1997 Inc.,www.persistence.com/pesr . . . ce/pagetwo.pages/technoview.html, pp. 1–9.

Java Relational Binding Delivers Transparent Java Access to Relational Databases, http://www.02tech.com, $O_2$ Technology, Oct. 7, 1996.

XDB's Jet Series (Java Enterprise Tools), XDB Systems, http://www.xdb.com/jet, Mar. 24, 1997.

Jetstore, XDB Systems, http://www.xdb.com/jet/store, p. 1, Mar. 24, 1997.

Jetassist Instant Database Applet Development for Java, XDB Systems, http://www.xdb.com/jet/assist, pp. 1–2, Mar. 24, 1997.

Jetconnect Universal Database Access for Java, XDB Systems, http://www.xdb.com/jet/connect, pp. 1–2, Mar. 24, 1997.

Objectstore DBConnect, ObjectStore Database for the Web http://www.odi.com/products/apc/ap_connect.html, pp. 1–5, Mar. 24, 1997.

Welcome to $O_2$ Technology Database Solutions for Object Developers, http://www.02tech.fr, pp. 1–2, Mar. 24, 1997.

*Primary Examiner*—Paul V. Kulik
*Attorney, Agent, or Firm*—Lawrence D. Maxwell

[57] ABSTRACT

A method and system for persisting an object in a relational database schema by creating a new relational table at application program run-time for each class of objects to be persisted. The method may generate a schema map object for each class of objects to be persisted. The schema map object may be generated in response to the first transaction in which an object of a certain class is to be persisted and remains in memory for persisting, querying, restoring or deleting objects of that class. The schema map object determines the fields of each class of objects to be persisted, defines one or more columns in the table in accordance with the data types of the fields, and controls the passing of data between the table and the object fields.

34 Claims, 14 Drawing Sheets

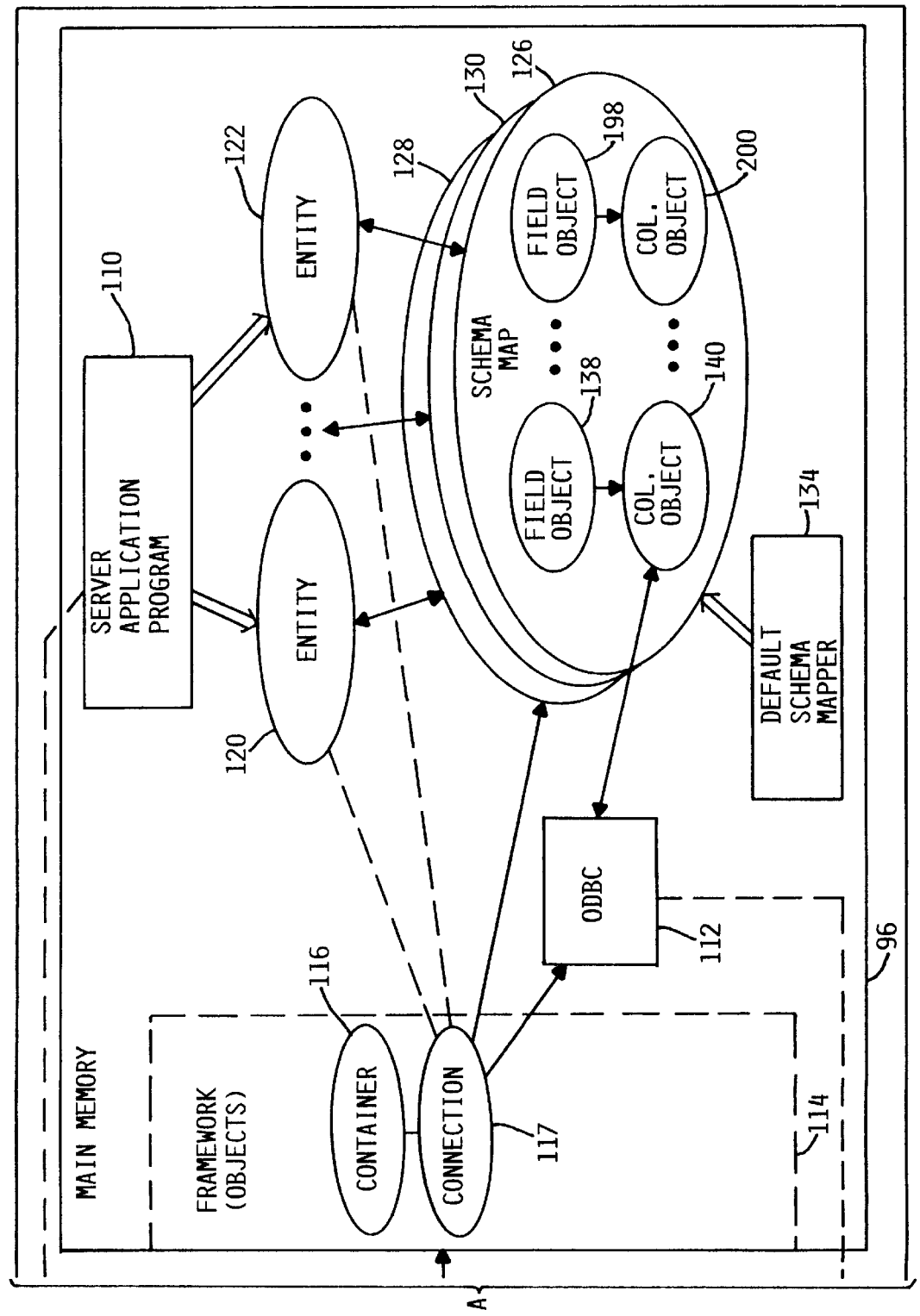

DEFAULT SCHEMA MAPPING

CROSS-REFERENCES TO RELATED APPLICATIONS

Ser. No. 08/883,838, filed Jun. 26, 1997, entitled "DEPENDENT PERSISTENCE," now U.S. Pat. No. 5,878,411 and Ser. No. 08/912,020, filed Aug. 15, 1997, entitled "LEGACY SUBCLASSING," now U.S. Pat. No. 5,956,730 are related.

BACKGROUND OF THE INVENTION

1. Field of the Invention

The present invention relates generally to object-oriented computing and relational data store systems and, more specifically, to automating the mapping of a collection of object classes to relational database tables.

2. Description of the Related Art

Businesses commonly need to store and access large quantities of data relating to specific business matters, such as their financial accounts, inventory, customers, employees, and other matters. Businesses use computers, of course, to aid this task. Businesses have invested billions of dollars in computer systems that store and access such business data. To minimize losses on this investment in computer systems, an important consideration in introducing new computer technology is adapting it to interface with existing computer technology.

A database is a structure in which a computer system may store a large quantity of data organized in a manner that facilitates efficient storage, search and retrieval. Physically, at the heart of any database is some suitable type of data store, such as magnetic disks, on which data may be recorded. Nevertheless, computer scientists and other researchers have developed a number of different conceptual models under which databases may be constructed.

The most prevalent database model is known as a relational database. In a relational database the data are organized in tables, also referred to as relations. Each data element in a table is indexed by its row and column in the table. Each row, also known as a tuple, represents an entity that is useful or meaningful to the business or other database user, and each column in that row refers to a data element that defines a characteristic or attribute of that entity. For example, each row in a company's database of its employees may refer to a certain employee. One column may refer to an employee's name, another column to an employee's identification number, and another column to an employee's address. Certain columns may be designated as "keys" to uniquely identify each row. For example, the column referring to an employee's name may be defined as a key. Keys may include primary keys, which are used as the primary means to access the rows, and foreign keys, which are used to define links between tables. The programmer who creates the database has considerable latitude in specifying the rows, columns, keys, and other characteristics that define the schema of a relational database.

The above-described data model underlying relational databases was developed to facilitate the storage and retrieval of data under the control of programming languages of the type that were prevalent at the time, which were primarily those known as procedural or structured programming languages. Because procedural programming languages and relational databases were for many years being developed and improved upon contemporaneously with one another, procedural languages are, not surprisingly, well-suited to manipulating relational database data. For example, a feature of most procedural programming languages allows a programmer to access an element of a table by specifying its row and column. Although a program would not necessarily access a database element using that feature of the programming language, the point to note is that relational schema and procedural programming share common concepts and programming philosophies.

Another type of programming, known as object-oriented programming (OOP), is becoming increasingly popular and may eventually supplant procedural programming. A potential problem, however, is that OOP languages do not inherently interface smoothly with relational databases. For example, the concept of indexing a table of data elements by row and column is in itself somewhat at odds with the OOP philosophy of handling an object in accordance with what it represents rather than how it is represented in a rigid data structure.

The goal of OOP is to reduce the time and costs associated with developing complex software by creating small, reusable sections of program code that can be quickly and easily combined and re-used to create new programs. The code sections are known as objects. OOP languages, such as Smalltalk, C++, and Java™, have been developed that allow programmers to approach their programming tasks in a way that is believed to be more natural and intuitive than that in which programmers traditionally approached tasks armed with only the tools of procedural programming languages. Using the unique tools or features of an OOP language, which are described below in further detail, a programmer can write code to define a software object that models something in the real world. The software object may model the attributes or characteristics of the real-world object and, in many cases, may also model its behavior. For example, a programmer whose task it is to create an employee database program can create an object that models an employee. An employee object may have certain attributes of a real employee, such as a name, an address, an employee number, and so forth. Exploiting the full capabilities of OOP, a programmer could use the employee object in a program in a manner that roughly corresponds to the way one would interact with a real employee. For example, the programmer could define the employee object to provide its address when the object is asked for that information or to provide its status, such as "on vacation," when asked for status information. It should be noted that accessing an element of a table by specifying a row and column is a concept foreign to object-oriented programmers and not in keeping with the OOP philosophy of modeling things in the real world in a natural, intuitive manner.

Object-oriented databases (OODBs) that are specifically designed to facilitate storage and retrieval of objects have been developed. Objects that are stored in a data store are known as persistent objects because they "persist" after the program that created them ceases executing.

Despite the recent development of dedicated OODBs, businesses have invested billions of dollars over the years in their existing or legacy relational databases. It would be an extraordinarily uneconomical task to transfer all legacy relational data into OODBs. Furthermore, relational databases are continuing to be developed and improved and remain widely commercially available. Therefore, software has been developed that interfaces object-oriented software to relational databases. Such software typically includes a schema mapper development tool that allows a database programmer to map the object schema to the relational schema. The software also typically includes a call-level interface. The call-level interface acts as a translator between an object-oriented application program and a relational database. Thus, although the objects are ultimately stored in relational format, the storage format is transparent to the application program, which may access them in the same manner as it would a persistent object in a dedicated OODB. An example of such software is described in U.S. Pat. No. 5,629,979, titled "A SYSTEM AND METHOD FOR PROVIDING A GRAPHICAL USER INTERFACE FOR MAPPING AND ACCESSING OBJECTS IN DATA STORES," incorporated herein by reference, and its related U.S. patent application Ser. No. 08/276,382, filed Jul. 18, 1994, titled "A SYSTEM AND METHOD FOR MAPPING AND ACCESSING OBJECTS IN DATA STORES", now abandoned.

As noted above, a database administrator or other user may use a schema mapper tool to manually define the mapping between the object schema of an application program and the relational schema of a database. The most basic function of the schema mapper allows the user to select a correspondence between the instance variable of an object and the columns of one or more relational tables. This process is time-consuming and requires considerable decisionmaking by the user. It would be desirable to automate schema mapping to speed the process and enhance ease-of-use. These problems are satisfied by the present invention in the manner described below.

SUMMARY OF THE INVENTION

The present invention relates to a method and system for persisting an object in a relational database schema by creating a new relational table at application program runtime for each class of objects to be persisted. The method generates a suitable object, referred to in this specification as a schema map object, for each class of objects to be persisted. Such a schema map object may control the method described below. The schema map object may be generated in response to the completion of a transaction by the application program involving the object or in response to other suitable occurrences. The schema map object is preferably generated in response to the first transaction in which an object of a certain class is to be persisted and remains in memory for persisting, querying, restoring or deleting objects of that class.

In the first step of the method, the fields of the object to be persisted are determined. The term "field" is synonymous with "instance variable" and refers to the means by which data is represented in the object. Although Java™ is the preferred language in which the invention is embodied, and "field" is typically used in the context of the Java™ language, the use of the term in this specification is not intended to limit the scope of the invention to any specific object-oriented language. Although other means may be suitable, the fields are preferably determined using Java Reflections™ methods, which allow the class object to be examined to determine, among other information, the names, data types and classes of the fields. The provision of a class object in Java™ facilitates determining the fields, since the class object rather than the object itself (i.e., instance of that class) can be readily examined using Reflections™. In the next step of the method, a table is created in the database if a table does not yet exist for the class. A row in the table is defined that corresponds to the object to be persisted. One or more columns are defined that correspond to the fields. A significant feature of the invention is that the object is "unencapsulated" to reveal the values of its fields. Unencapsulation may be performed by employing a native method that is capable of accessing all fields, including private fields, of the object, or by other suitable means. Lastly, the values read from the fields are stored in the columns of that row of the table in accordance with the correspondence between the columns and the fields. Although the novel aspects of the invention perhaps relate most closely to the method by which objects are stored, i.e., persisted, in the database, the invention also relates to the methods by which persistent objects are restored, i.e., retrieved, from the database or deleted from the database.

The correspondence between the columns and the fields may depend upon the type of data to be stored. For example, a field of a type such as integer, character, long, float, string, and other primitive data types conventionally supported by object-oriented programming languages may be stored in a corresponding column that is formatted or declared to receive data of that type. Nevertheless, a field of a non-primitive type, such as the hashtable and vector types supported by the Java™ language, may not be readily storable in this manner. Therefore, the invention preferably streams an object having such a field, i.e., transmits it in binary format, to a column declared to receive binary bit stream data.

Containment (by value) is a concept common to most object-oriented languages whereby an object may contain another object, and in such a case the invention may persist a contained object along with the containing object. Similarly, an object may contain a reference to another object. References or pointers to objects, which are themselves objects, are referred to in this specification as handles, and a handle contained in an object is referred to as an embedded handle. A handle, like any object, may include one or more fields. The invention preferably creates a column for an embedded handle and streams the handle to the column.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIGS. 7A–D is a flow diagram illustrating creation of a schema map object, wherein FIG. 7A is the first portion of the diagram, FIG. 7B is a first continuation, FIG. 7C is a second continuation; and FIG. 7D is a third continuation;

DESCRIPTION OF PREFERRED EMBODIMENTS

Figure 1:
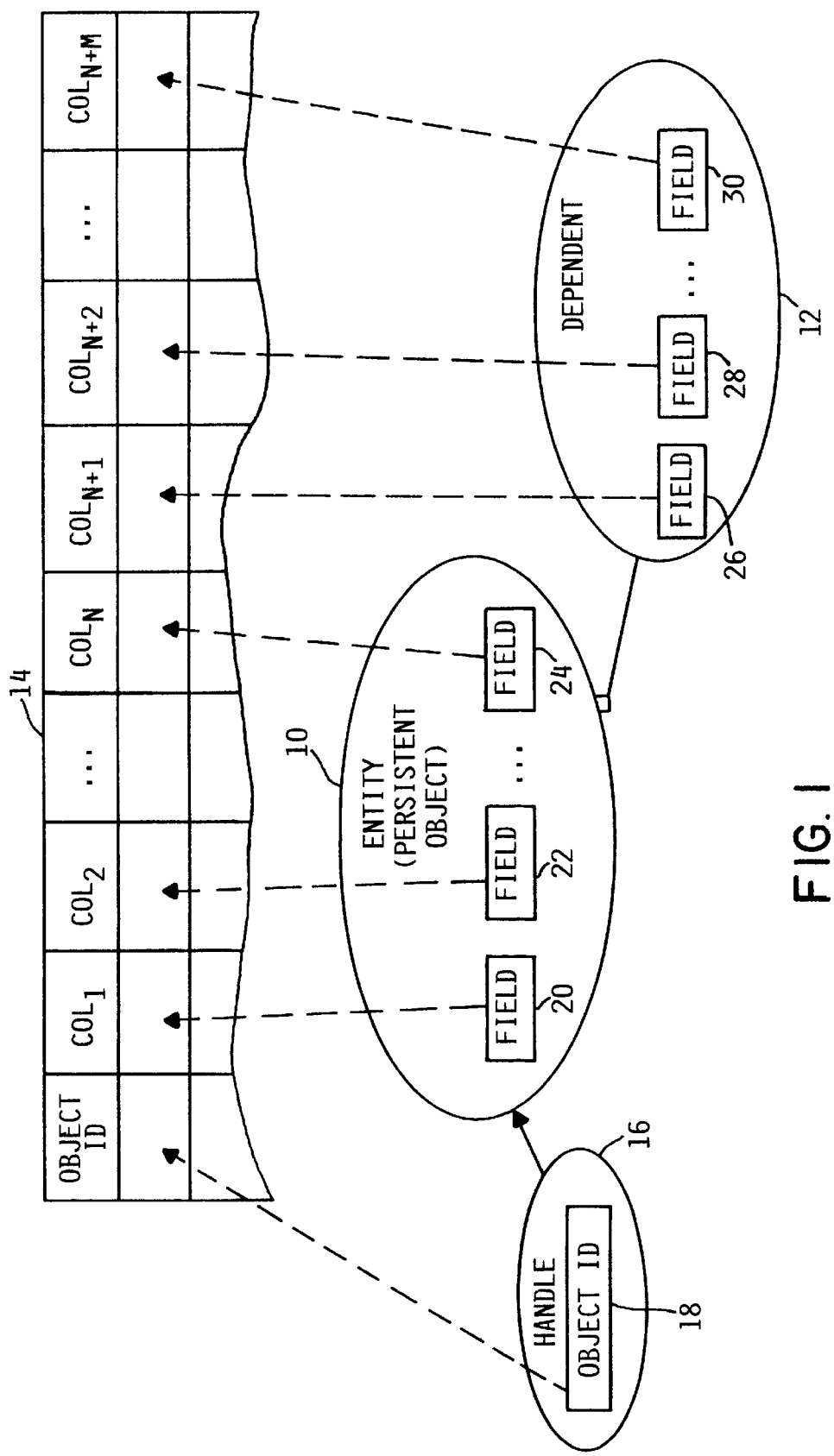
FIG. 1 illustrates an exemplary mapping between an object containing another object and the columns of a database table.

The present invention relates to a method and system for persisting an object in a relational database. An Overview section is provided below for the benefit of readers who are not generally familiar with the dependent mapping problem that the present invention addresses. Readers who are skilled in the art of OOP technology and relational database technology may wish to skip the Overview section and proceed directly to the Detailed Description section of this specification.

1. Overview

OOP differs from standard procedural programming in that it uses objects rather than procedures as the fundamental building blocks for creating computer programs. Both objects and procedures are embodied as sections of code that may be written in a high-level language. Nevertheless, how a programmer uses objects to design programs differs greatly from how a programmer uses procedures. Both OOP and procedural programming have as a goal to break a programming task into smaller, more manageable sub-tasks. Although a procedural programmer may break a program into a hierarchy of procedures, each of which performs an algorithm, the procedures are generally not autonomous. Thus, although a procedure lower in the hierarchy potentially could be re-used in a different program by a different procedure higher in the hierarchy, such re-use of code is not nearly as straightforward or intuitive as the re-use of objects.

A fundamental concept in OOP is the class. A class is a template or prototype that defines a type of object. A programmer may define a class by writing a section of code known as a class definition. An object is an instance of a class. An object is created or instantiated at run-time, i.e., when the computer executes a statement in the program calling for the instantiation of an object of a specified class. An object may include attributes or data as well as functions or methods. The class definition specifies the attributes and methods. The attributes are represented in an object by the values of instance variables.

Another important concept of OOP is encapsulation. Often, an object may perform its function without needing to reveal its implementation or internal data. A class definition may specify that the data of objects of that class is private and cannot be retrieved by another object. Objects must communicate with one another via their object interfaces, and the data may be encapsulated by limiting access to it through the object interface. Such data can only be modified by the object methods.

Another important concept of OOP is inheritance. Inheritance is the ability to derive a new class from one or more existing classes. The new class, known as a subclass, may inherit or incorporate all properties of a base class, including its attributes and its methods. The new class or subclass may be defined to include additional properties.

Objects communicate with one another by sending and receiving messages. A powerful concept of OOP, known as polymorphism, is that objects of different classes may respond to the same message in different ways.

Encapsulation, inheritance and polymorphism are three important concepts that differentiate OOP from procedural programming. Another concept that is featured in many OOP languages is known as aggregation or containment by value. A dependent, as the term is used in this patent specification, is a type of aggregation. A dependent object differs from other types of objects in that it is not shared. Rather, a dependent object is contained within another object, which may be referred to as an entity to distinguish it from dependents and other classes of objects.

A framework is a collection of base classes that extends the power of object-oriented systems. Stated another way, a framework is a set of cooperating classes that make up a reusable, extensible architecture. A framework functions as the operating environment. A programmer can use the base classes to derive more specialized classes that represent business objects or entities.

A persistent object can be preserved beyond the termination of the process that created that object. A framework that supports persistent objects includes methods that allow persistent objects to be stored in and retrieved from a non-volatile data store, such as a magnetic disk or writeable optical disk.

2. Detailed Description

The system of the present invention preferably operates in response to the completion of a transaction by an application program in a client-server computing system. The transaction may require that an object used by the application program be stored in, retrieved from, or deleted from a database. Such an object is known as a persistent object. The system determines a mapping between the fields of the object and the columns of a database table. If the transaction requires storage or updating of an object, a table is created in the database if one does not already exist. The system then reads the fields of the object and stores their values in the table in accordance with the mapping. The use of the term "field" in this patent specification reflects a preference for the software of the present system and the application program to be written primarily in Sun Microsystems, Inc.'s Java™ language; Sun Microsystems' Java™ specifications use the term "field" to refer to what other object-oriented languages more commonly refer to by the term "instance variable" or a similar term. Although Java™ is preferred, C++ or other object-oriented languages would be suitable. Therefore, the term "field" as used in this specification should be construed as equivalent to "instance variable" and any other terms that refer to the data of an object. The mapping is described below first, followed by details of the system and method.

The mapping depends upon the nature of the contents of the fields of the object. With certain exceptions, each field is mapped to one column. FIGS. 1–4 illustrate some exemplary mappings.

As illustrated in FIG. 1, an entity 10 and its dependent 12 are mapped to a database table 14. The terms "entity" and "dependent" are used in this specification to refer, respectively, to an object and a contained object. These terms are used for purposes of convenience because they are the preferred terms given to such objects in the context of IBM's "San Francisco" business framework environment. Nevertheless, objects and objects contained within objects are concepts common to essentially all object-oriented programming languages and environments. For purposes of this specification, the terms should be construed to mean any objects that may need to be persisted. The concept of a framework is mentioned again below, but is otherwise not relevant to the invention. A handle 16 presents another concept that is included in the San Francisco framework environment and, for that reason, is referred to in this specification by the particular term "handle," but is generally included in other object-oriented frameworks or environments as well. A handle is an object that references or identifies another object. In this example, handle 16 references entity 10. Handle 16 includes an object identifier 18, which is data that uniquely identifies entity 10. In other words, each entity of a class has such an object identifier associated with it that is different from the object identifier of all other entities of that class. Handles may also include other fields, such as a field that identifies the class of the entity it references. In these examples, the object identifier is preferably generated by a suitable framework mechanism (not shown). A framework-generated object identifier is a well-known concept in distributed object-oriented programming and is often referred to in the art as a universally unique identifier (UUID). In other frameworks or environments, a field of the object to be persisted (entity 10 in this example) may uniquely identify the object and may therefore be used in the same manner as object identifier 18. Although such a field may be a UUID, alternatively, it may be data pertinent to the object, such as a person's name, employee number or Social Security number. As described below, the object identifier or similarly distinguishing data functions as a primary key of the database table.

Object identifier 18 is mapped to the first column of table 14, which is labeled in the manner required by the database by a suitable name, represented in this example by "OBJECT ID". (Mapping is indicated in these examples by dashed line.) The first field 20 of entity 10 is mapped to the second column of table 14, which is labeled by a suitable name, represented in this example by "$COL_1$". A preferred column naming convention is described below in connection with the detailed description of the system and method. The second field 22 of entity 10 is mapped to the third column of table 14, which is labeled "$COL_2$", and so forth (as indicated by the ellipsis (" . . . ")), up to the nth field 24 of entity 10, which is mapped to the column labeled "$COL_N$". The fields of dependent 12 are also mapped. One of the fields of entity 10 that is not shown because it is itself not mapped is declared of a type that represents a dependent. As more fully described below, the mapping method proceeds on a field-by-field basis until this field is reached, at which time the dependent is mapped. The first field 26 of dependent 12 is mapped to the column of table 14 labeled "$COL_{N+1}$". The second field 28 of dependent 12 is mapped to the column of table 14 labeled "$COL_{N+2}$", and so forth, up to the mth field 30 of entity 10, which is mapped to the column labeled "$COL_{N+M}$". This type of mapping of entities and their dependents (if any) is suitable for entities and dependents having fields declared to be of primitive data types, such as integer, floating point, character, string, double precision, long, byte, boolean, array, and similar types that are common to many programming languages. As described further below, the database columns to which such fields are mapped are configured using the appropriate structured query language (SQL) statements to accept data of these types.

Figure 3:
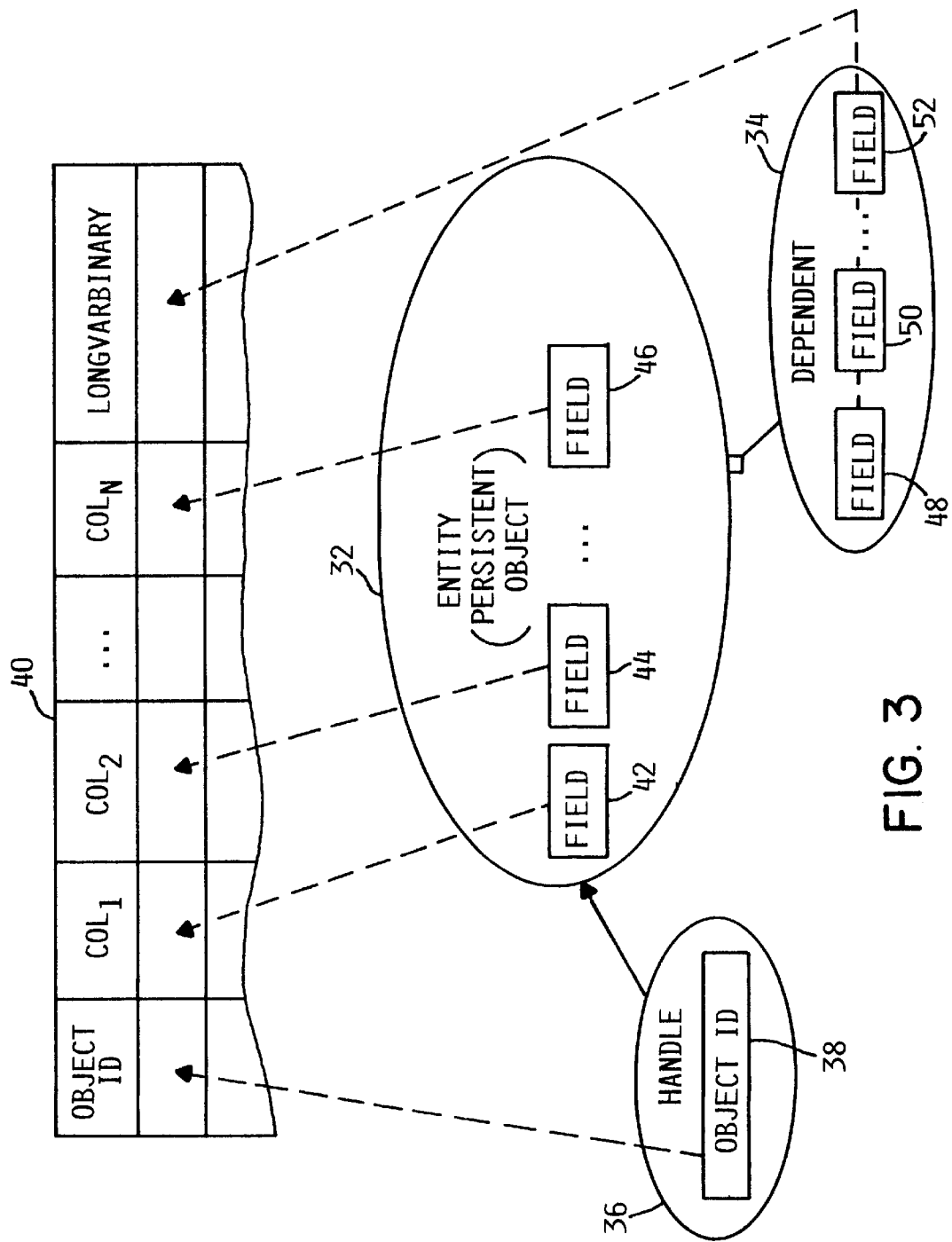
FIG. 3 illustrates another exemplary mapping between an object containing another object and the columns of a database table.
Figure 4:
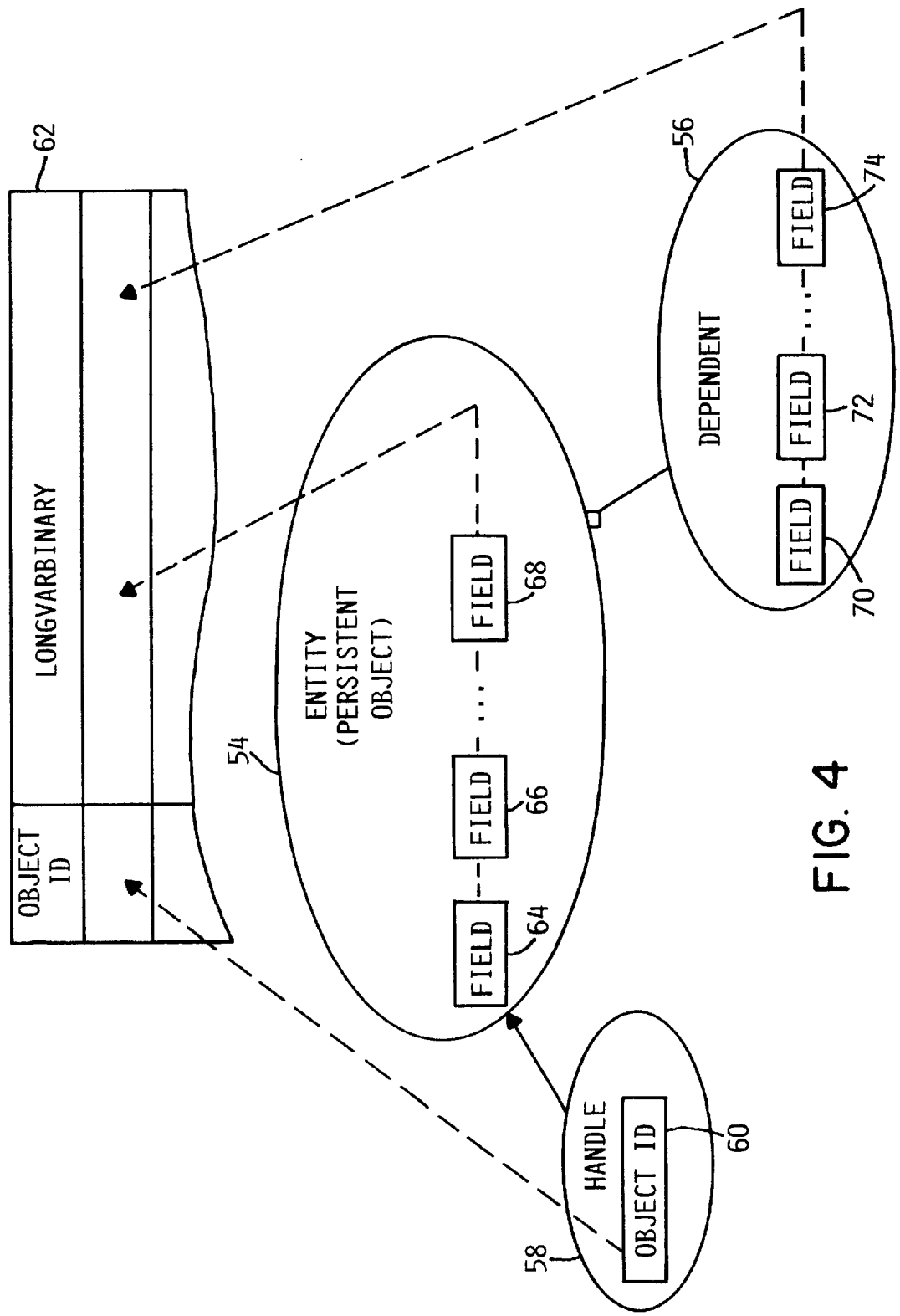
FIG. 4 illustrates still another exemplary mapping between an object containing another object and the columns of a database table.

Fields declared to be of other, non-primitive data types may be less readily mappable than fields of the primitive data types described above. Java™, for example, defines a data type HASHTABLE and a data type VECTOR. Database columns cannot be configured to accept such data directly because SQL presently does not define any suitably equivalent data types. FIGS. 3 and 4 illustrate examples in which objects having fields declared to be of non-primitive types are "streamed" to a column that is configured to accept data in binary format or, in SQL syntax, data of type LONG-VARBINARY. Streaming data in binary format is a familiar concept to those skilled in the art in other contexts, such as communicating data with a network port.

As illustrated in FIG. 3, an entity 32 has a dependent 34. As in the example described above with respect to FIG. 1, a handle 36 has an object identifier 38 that is mapped to an object identifier column of a table 40. Also, as in the above-described example, fields 42, 44 and 46 are mapped to further columns of table 40. Unlike dependent 12 in the above-described example, dependent 34 has fields 48, 50 and 52 that are all streamed to a LONGVARBINARY column of table 40 because one or more of those fields is declared to be of a non-primitive type such as HASHTABLE or VECTOR. Generally, if one field of an object is to be streamed, all fields of the object are streamed.

As illustrated in FIG. 4, an entity 54 has a dependent 56. As in the above-described examples, a handle 58 has an object identifier 60 that is mapped to an object identifier column of a table 62. Fields 64, 66 and 68 are all streamed to a LONGVARBINARY column of table 62 because one or more of those fields is declared to be of a non-primitive type such as HASHTABLE or VECTOR. Dependent 56 has fields 70, 72 and 74. Those fields are streamed to the same column of table 62 because a dependent is considered to be part of the entity, and if the entity is streamed, any and all of its dependents are also streamed.

Other reasons for streaming an entity may include that it contains an object defined as a Java™ Interface or Abstract class. It may also be desirable to stream an entity that has no persistent fields, i.e., all of its fields are declared Static or Transient. Furthermore, it may be desirable to stream an entity if it has a dependent of the same class as itself, indicating a linked list.

Figure 2:
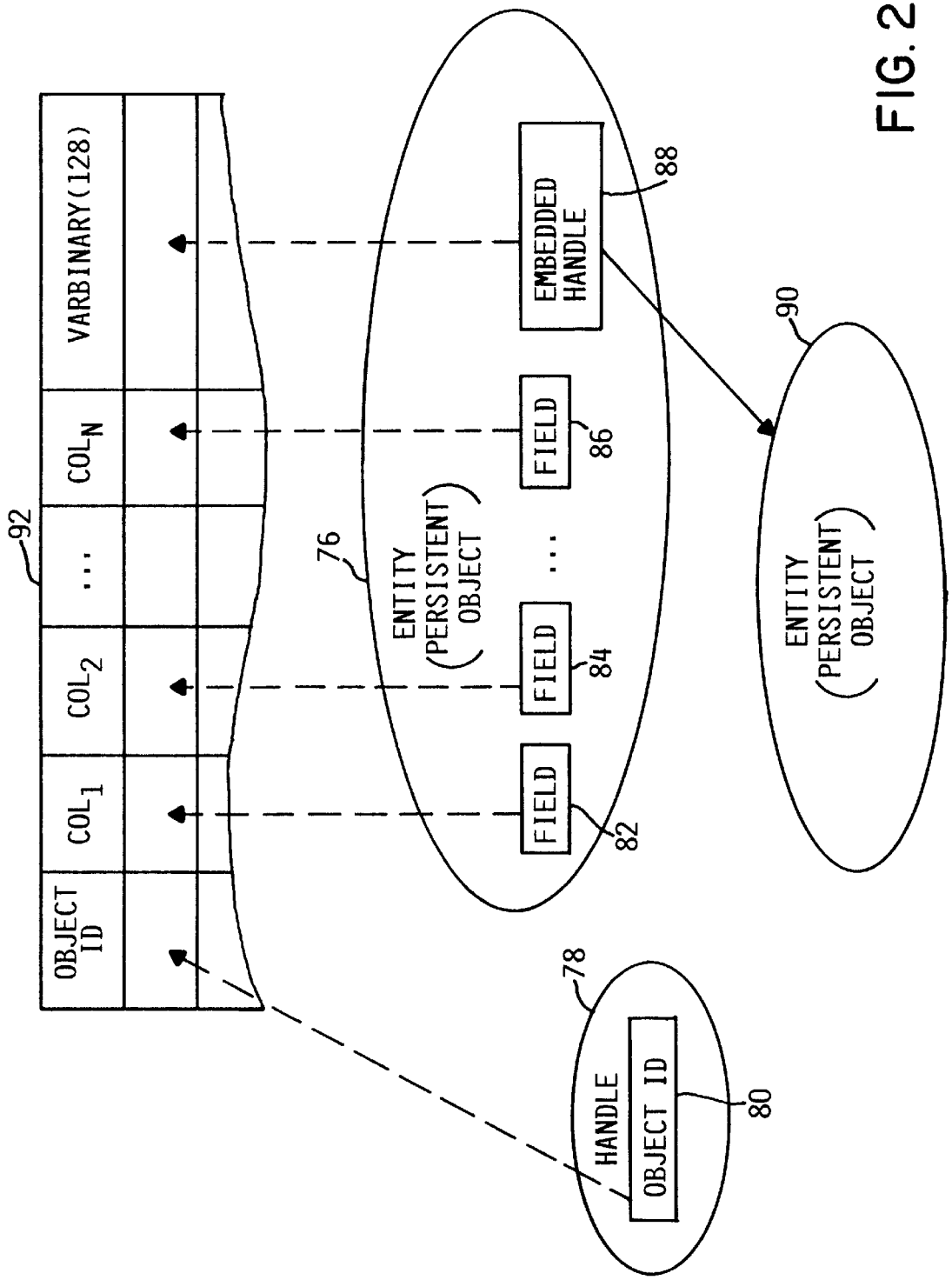
FIG. 2 illustrates an exemplary mapping between an object having a reference to another object and the columns of a database table.

There is a case in which it may be desirable to stream a field without streaming all other fields. As illustrated in FIG. 2, an entity 76 has a handle 78 with an object identifier 80 and has fields 82, 84, 86 and 88. Field 88 is an embedded handle. Handle 78 and the handles like it in the above-described examples are known as independent handles because they are, at least conceptually, separate objects from the entities they reference. In contrast, an embedded handle is a field of an object (an entity or a dependent) that is declared to be of a type that represents a handle. An embedded handle references another entity, such as entity 90 in this example. Entity 90 may have its own fields, which are not shown for purposes of clarity, and is persisted in accordance with the invention in the same manner as any other entity. While fields 82, 84 and 86 are mapped to columns of the table 92 configured to accept primitive data types, field 88 is mapped to a column configured to accept data of type VARBINARY(128), which is another SQL type.

Figure 5A:
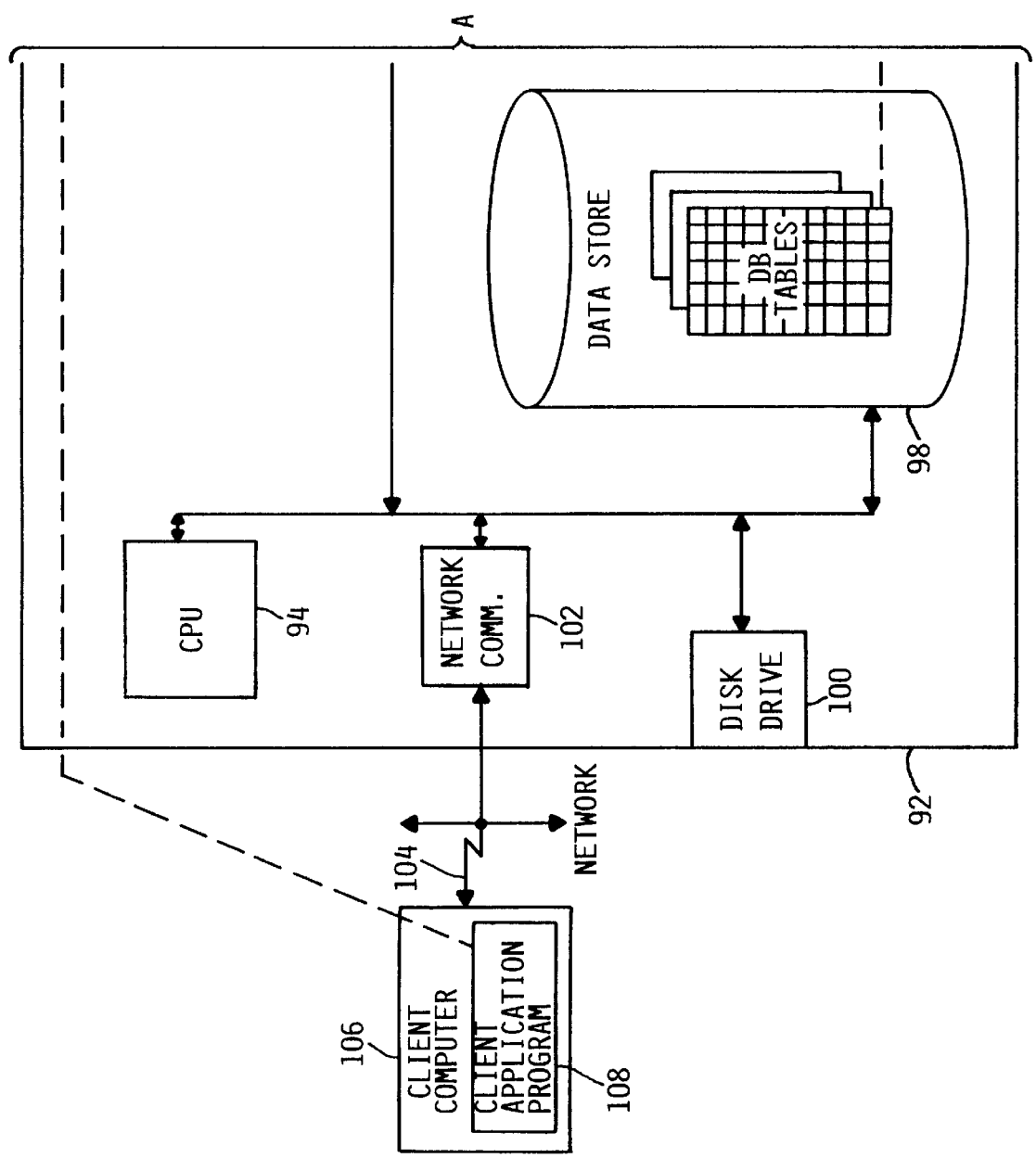
FIG. 5 illustrates a client-server computer system having a relational data store, in which the method of the present invention maps between the relational schema of the data store and the object schema of the run-time environment.

FIG. 5 illustrates a client-server computer system in which the processes or methods of the present invention may be implemented. A suitable server computer 92 may be programmed in any suitable manner that effects these processes or methods. Server computer 92 includes a central processing unit 94, a main memory 96, a data store 98, a disk drive 100 or similar removable-media storage device, and network communication interfaces 102. A network communication link 104 connects server computer to other computers, such as the client computer 106. Although not shown for purposes of clarity, server computer 92 may include other components commonly included in a computer, such as a keyboard and a pointing device such as a mouse. Disk drive 100 may be used for, among other purposes, recording or reading the software, schema map objects and other computer program products described below. Data store 98 is illustrated rather conceptually for purposes of clarity, but all hardware and software necessary to perform database system functions is included. This hardware and software, collectively referred to as a relational database system, accepts SQL statements and queries in the manner known in the art. The connectivity between data store 98 and the software of the present invention is described in further detail below. Although data store 98 is illustrated as being integral to server computer 96 for purposes of clarity and convenience, it may be remotely located and accessed via network communication link 104. Similarly, the software, schema map objects and other computer program products described below may be transmitted to or received from remote computers via network communication link 104.

An application program, consisting of a client application program portion 108 and a server application program portion 110, operates on the computer system. The client and server application program portions 108 and 110 interact with one another, as indicated by the dashed line connecting them. For purposes of describing the present invention, application program details are of little relevance. The application program is preferably written in Java™. For purposes of the present invention, it is sufficient to note that the application program performs transactions, as that term is used in the art, that require objects used in the transaction to be stored in, retrieved from or deleted from the database. It should also be noted that the application program defines object classes and their fields and methods. (In this specification, the term "methods" is sometimes, as in the previous sentence, used in its context as an object-oriented term of art, and sometimes used in its patentable subject matter context, e.g., the methods or processes of the present invention. Although the latter may include various aspects of the former, it may be help the reader to be mindful of a distinction.)

It is known in the art that an application program may invoke the services of a database connectivity system to store data in and retrieve data from a relational database, represented in FIG. 5 by ODBC driver/manager 112. The open database connectivity (ODBC) system, developed by Microsoft Corporation of Redmond, Wash. is one such system that interfaces application programs and relational databases. The Java™ database connectivity (JDBC™) driver, developed by Sun Microsystems of Mountain View, Calif., is intended to be used in a Java environment. ODBC and JDBC include a driver manager and driver components. ODBC and JDBC are call-level interfaces, meaning that they consist of a set of function calls in a high-level application programming language, such as C, C++ or Java. A driver implements an application program interface (API) that supports a particular database system. An application program may call ODBC or JDBC functions to store, retrieve or delete data. In response to these calls, the driver generates SQL statements that are suited to the particular database management system. Because those persons skilled in the art of the present invention are ordinarily familiar with ODBC and JDBC, further details regarding their architecture and use are not provided in this patent specification. Background information that may be of interest to software developers may be found in, for example, Kyle Geiger, *Inside ODBC*, Microsoft Press, 1995.

The present invention uses ODBC rather than JDBC for several reasons. Not the least of these reasons is that at the time of this invention, few reliable JDBC packages were commercially available. The more significant reason, however, is that the present invention includes C++ native methods to facilitate access to the private fields of Java™ objects.

The software preferably further includes a suitable object framework 114. A framework is a well-known concept in distributed object-oriented programming that consists, in essence, of set of base classes from which a programmer may derive the classes used in the application program. For purposes of describing the present invention, framework details are of little relevance. It is sufficient to note that certain objects defined by the framework manage the transactions. In the exemplary framework, a container object 116 responds to a transaction by creating a connection object 117 and associating it with the database resource via ODBC driver/manager 112. The association is referred to as a connection, and connection object 117 and its connection to the database resource are maintained during all database operations involved in that transaction.

It should be noted that, although the above-described objects and other software features are illustrated as existing in memory 96, they do not necessarily exist simultaneously. Furthermore, although certain interactions and associations between them are illustrated by solid lines with arrows and dashed lines, there may be other interactions and associations that are not illustrated for purposes of clarity. Moreover, other software features may exist in memory 96 to effect processes that are conventional to a client-server computer system operating in the framework and that are not directly relevant to the present invention. The remaining objects and software features illustrated in FIG. 5 are described below in connection with the methods of the present invention.

Figure 6:
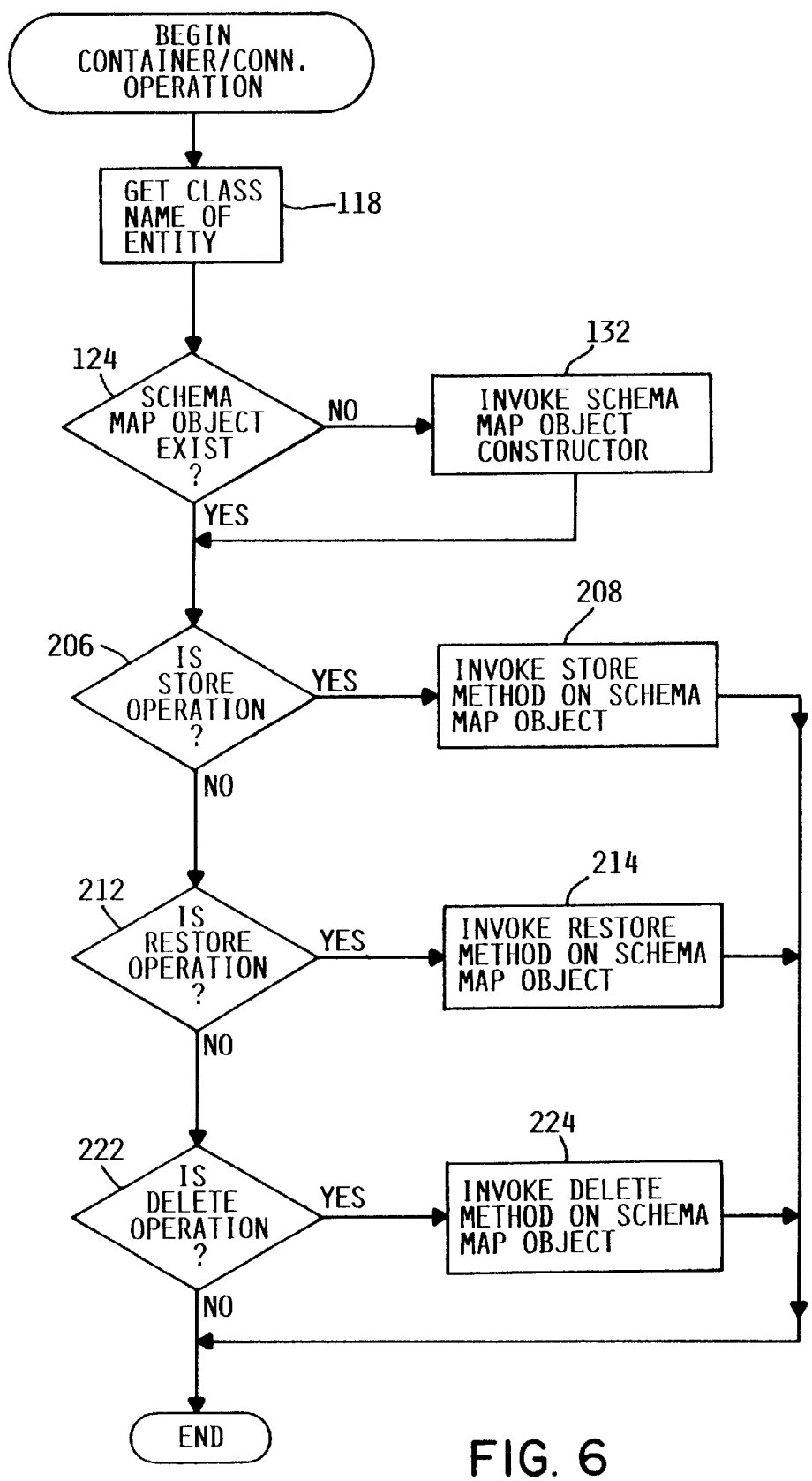
FIG. 6 is a flow diagram illustrating initialization of the methods of the present invention.

FIG. 6 illustrates the method by which container object 116 initiates the persistent operation (store, restore or delete an entity) in response to a transaction. At step 118, container object 116 gets the class name of the entity. In the exemplary system, the class name of an entity is stored in a field of its handle. Nevertheless, most object-oriented languages and environments provide a mechanism for determining the class of an object. FIG. 5 illustrates a number of exemplary entities, such as entities 120 and 122, existing in memory 96 at the time of the transaction. The arrows between entities 120 and 122 and server application program 110 indicate that the application program includes the constructor program code that defines and controls entities 120 and 122 in the conventional manner. The transaction may require, for example, that entity 122 be stored in the database. At step 124, container object 116 determines whether a schema map object of the entity's class exists in memory 96. A schema map object corresponding to that class would exist in memory 96 if the application program had previously performed a transaction involving an entity of that class. For example, the arrow between entity 122 and a schema map object 126 in FIG. 5 indicates that schema map object 126 corresponds to the class of entity 122. Similarly, the arrow between entity 120 and another schema map object 128 indicates that schema map object 128 corresponds to the class of entity 120. Other schema map objects, such as schema map object 130, may correspond to other entities that may exist in memory 96, as indicated by the ellipsis (" . . . "). Container object 116 may use connection object 117 to locate a corresponding schema map by invoking an appropriate method on connection object 117. The connection object may maintain a list of all schema map objects that have been used with that connection to the database. If, no schema map object corresponding to the class of the entity involved in the transaction exists in memory 96, container object 116 causes connection object 117 to create a new schema map object at step 132. The arrow between a default schema mapper 134 and schema map objects 126, 128 and 130 indicates that default schema mapper 134 includes the constructor program code that defines and controls the schema map objects. The term "default" is intended to refer to a preference for the method of schema mapping described in this specification over other alternative methods of schema mapping. For example, a system may provide a user with several schema mapping options, each providing a different level of user control and flexibility. At one end of the spectrum, a schema mapping method may include the use of a custom schema mapper tool that allows a user to exercise complete control over the mapping. The present invention, referred to as default schema mapping, is at the other end of the spectrum because the mapping is performed essentially without user intervention using certain default mapping rules. As mentioned above, the most general default mapping rule is to map each primitive field to one correspondingly typed column and map each object having a non-primitive field to a column typed to receive streamed data.

Figure 7A:
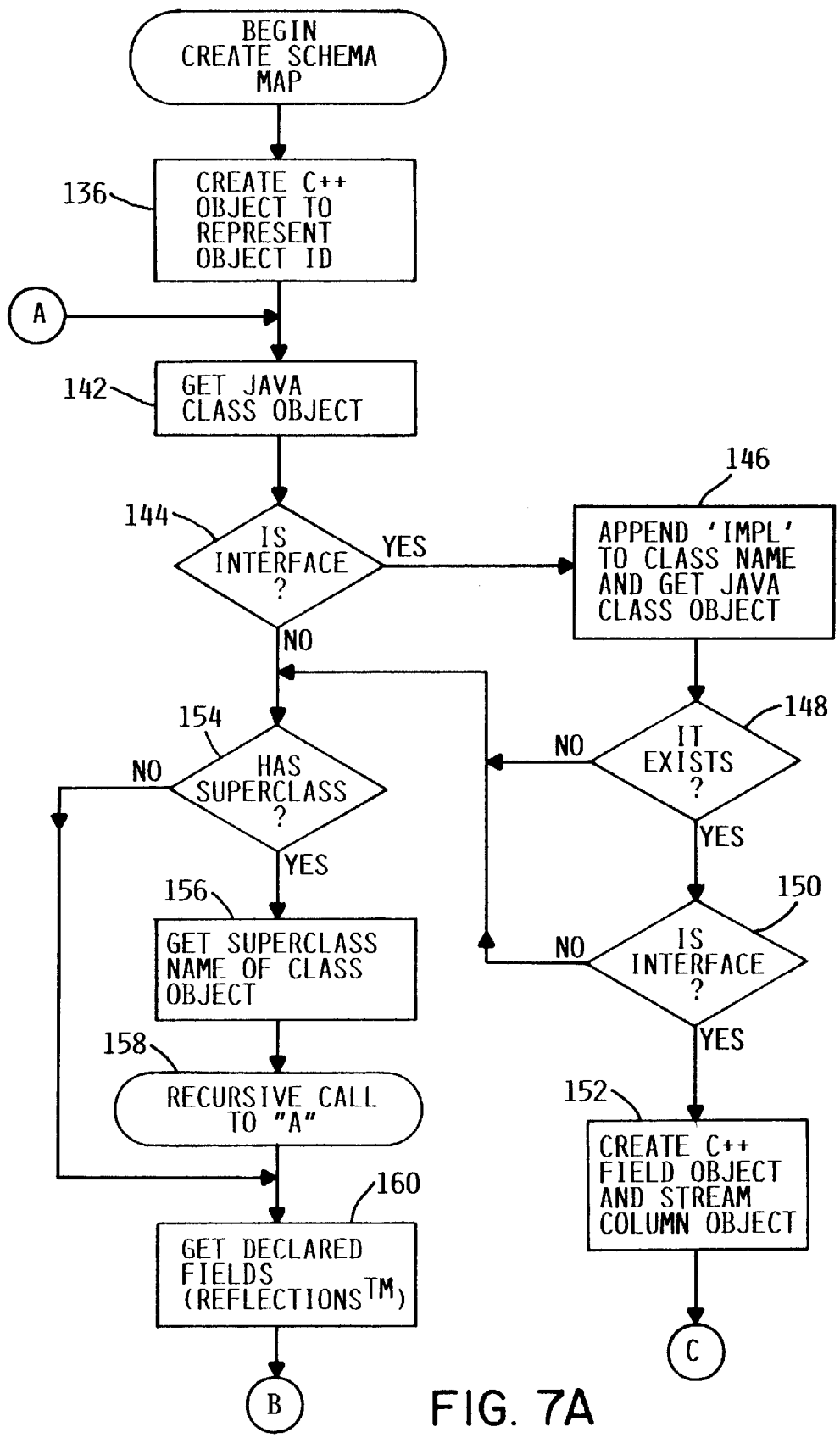
Figure 7B:
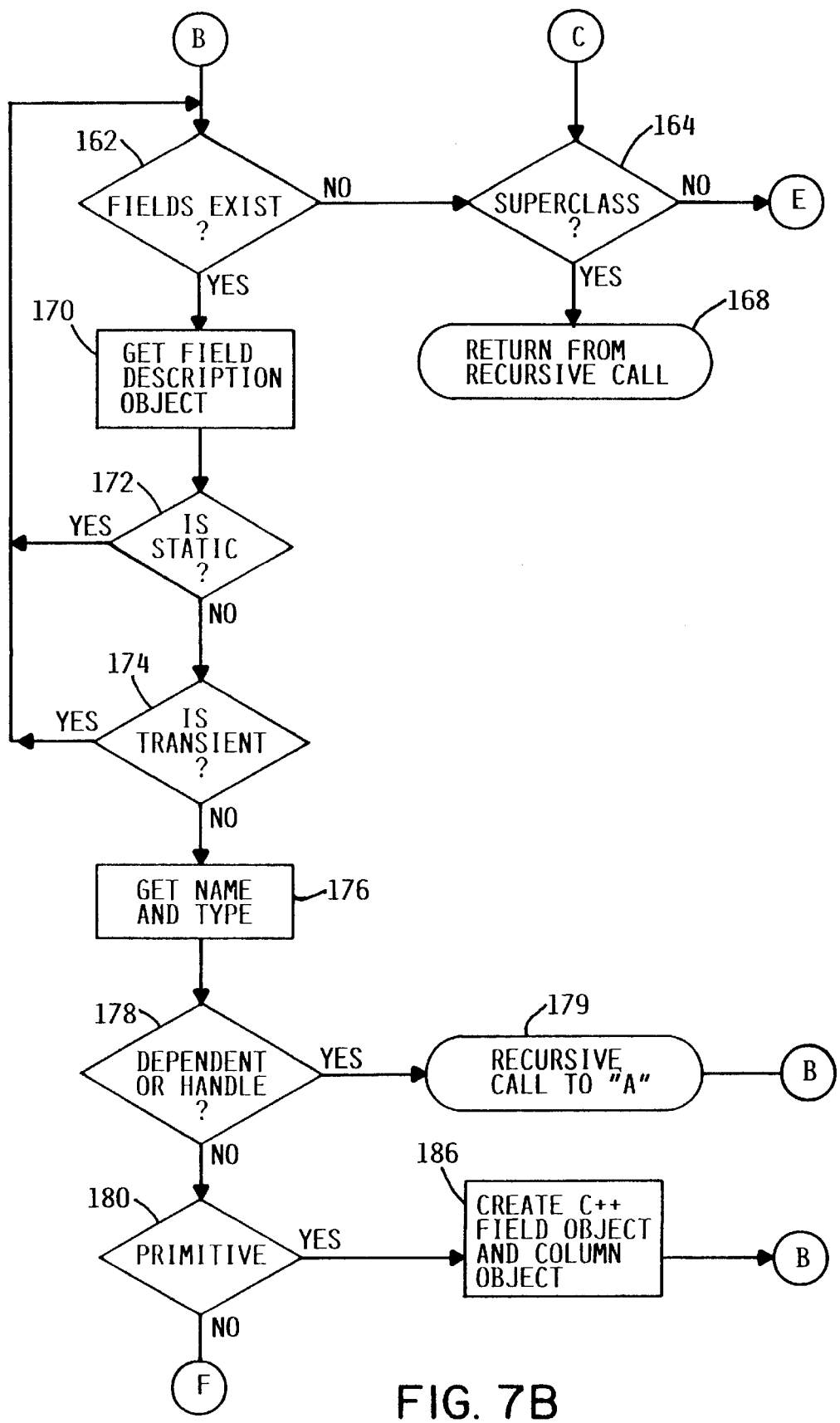
Figure 7C:
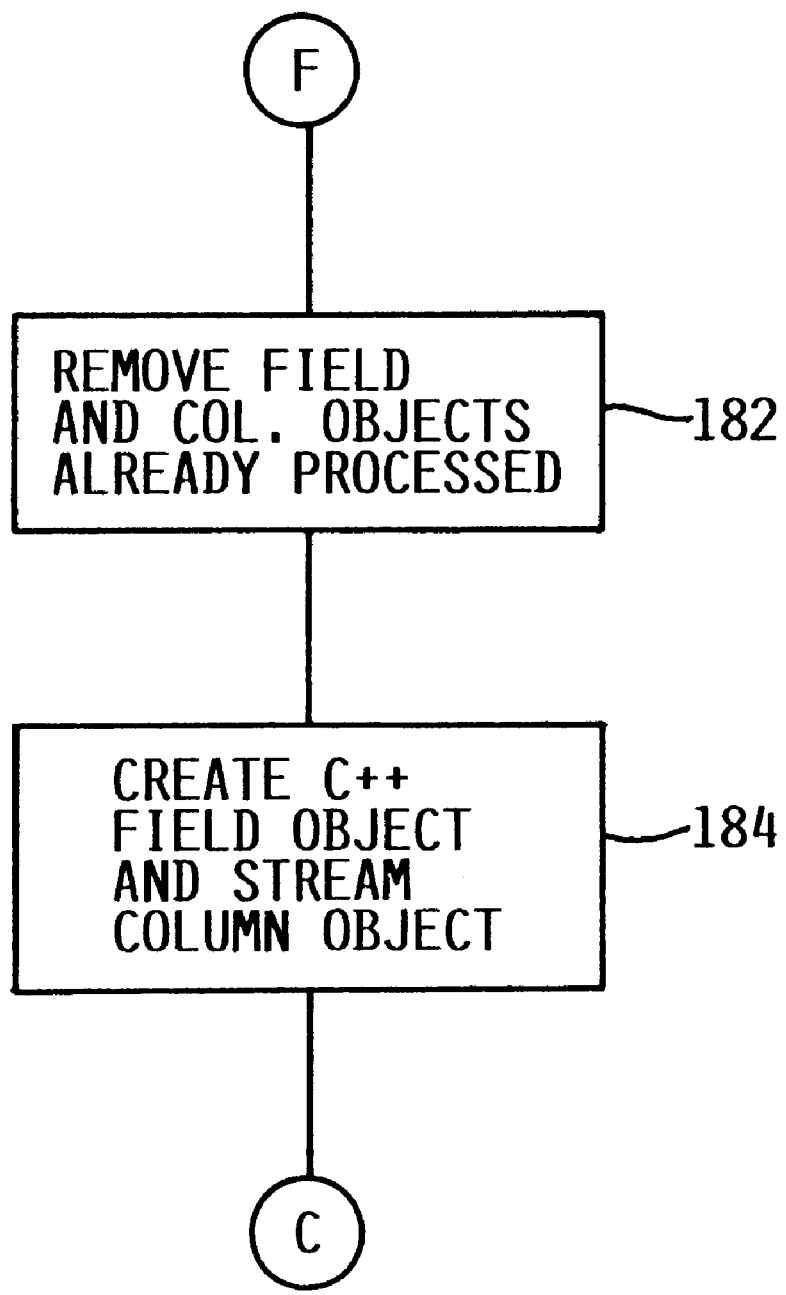
Figure 7D:
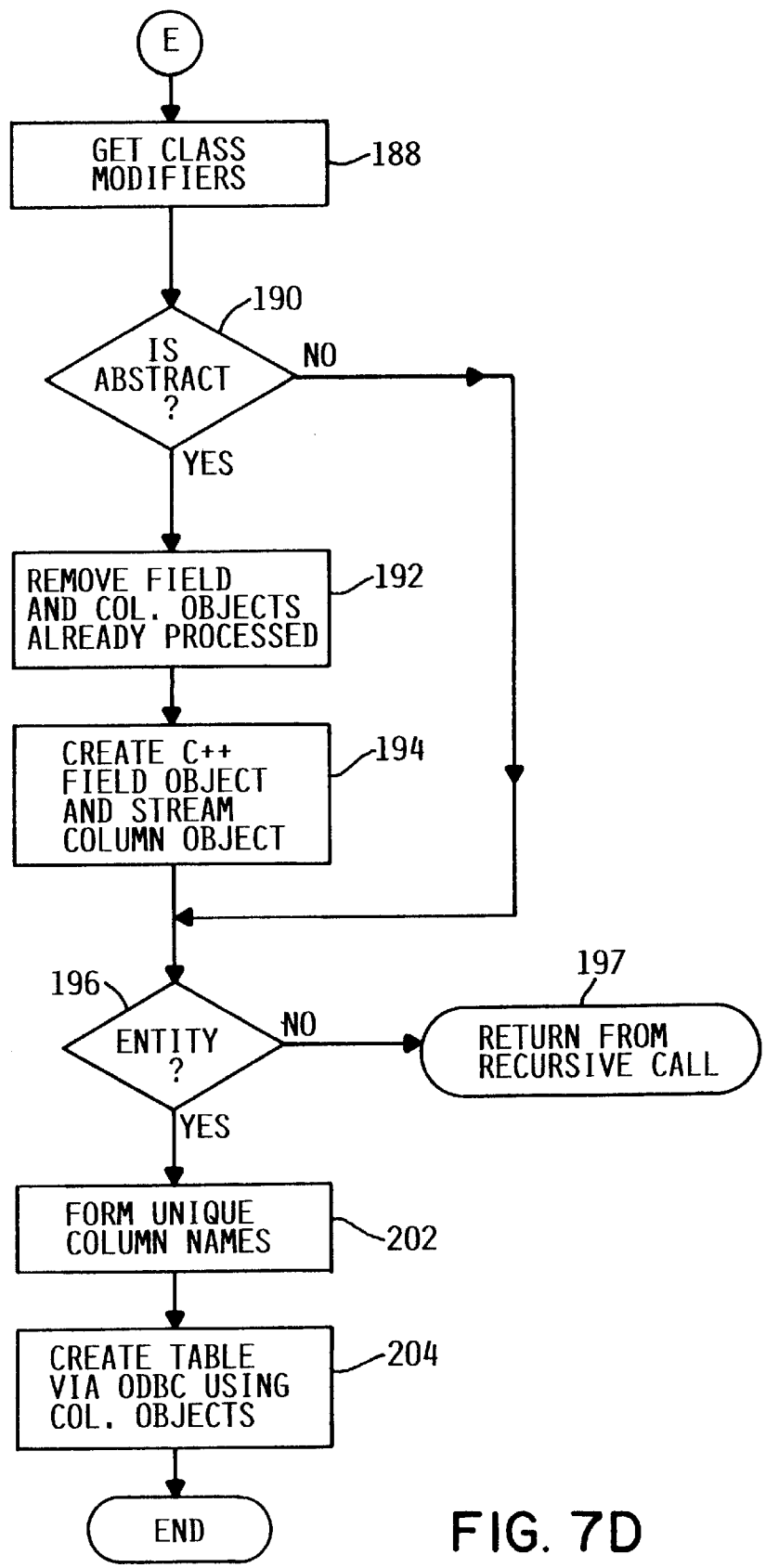

The creation of a schema map object, such as schema map object 126, causes it to perform the methods illustrated in FIG. 7A. At step 136, schema map object 126 creates a pair of C++ objects: a field object 138 and a column object 140 (FIG. 5). This first pair of objects relates to the primary key of the table in which the data of entity 126 is stored. Field object 138 includes methods that pass the object identifier between the entity's handle and the corresponding database column to which the object identifier is mapped. Column object 140 is used to buffer this data, as described further below.

Although the entities are preferably defined in Java™, field object 138 and column object 140 are defined in the C++ language for the reasons noted above; namely, the facilitate access to the database using ODBC and to allow access to the private fields of the Java™ entity. It is known that the encapsulation feature prevents a Java™ object from accessing any fields of another Java™ object that are labeled with the PRIVATE modifier. Java™ provides a feature known as the Java™ Native Interface (JNI) that functions as a protocol for native methods that implement a Java™ method invocation. A native method is one that is not written in Java™. If a Java™ object invokes a method having the NATIVE modifier, the object locates the non-native code, C++ code in this case, that defines or implements the object method. Default schema mapper 134 includes constructors directed to these C++ native methods such that, when a schema map object is instantiated, it includes these native methods.

At step 142, schema map object 126 invokes a method to get the class object for the class of entity 122. Java™, unlike most other object-oriented programming languages, provides a class object for each class. As known in the art, the class object can be used to maintain information that is common to all instances or objects of the class. The present invention uses the class object to determine the fields of the entity and other information about the entity. At step 144, for example, schema map object 126 invokes a method on the class object to determine if it is defined as an interface. If the class is an interface class, it has no fields to persist because an interface class defines only methods. Therefore, at step 146, schema map object 126 looks for an implementation of the interface that could be persisted. In accordance with a convention of the framework, schema map object 126 appends the suffix "Impl" to the class name and invokes a method to get the Java™ class object of the resulting name.

At step 148, schema map object 126 determines if a Java™ class object exists for the interface class implementation. If one exists, at step 150, schema map object 126 then invokes the method on it to determine if it too is defined as an interface. If the implementation, which is contained in the object, is defined as an interface as well, then the (containing) object is to be streamed. At step 152, schema map object 126 creates another pair consisting of a C++ field object and a C++ column object. The column object is provided with a field declared of type to receive an array of bytes representing a streamed object. The field object includes a method that communicates data in streamed format between any objects referenced by the interface object and a corresponding database column. The column object is used to buffer this streamed data, as described further below.

If the class object is not an interface, at step 154, schema map object 126 invokes a method on it to determine if it has a superclass that the current class extends from. If a superclass exists, the method returns a superclass object at step 156. At step 158, schema map object 126 recursively calls the method beginning at step 142 to get a class object. The recursive calls return all of the class objects for the entity class and the superclasses it may extend from.

At step 160, schema map object 126 invokes a method on the class object (whichever class or superclass object that may be at the current level of recursion) that returns an array of field description objects, each describing one of the fields of the class objects. If no fields exist in the object class, the method returns a boolean value indicating such. The method uses the Java Reflections™ feature. Reflections™ is a set of methods that provide information describing the fields of a Java™ object. It allows other objects to, in effect, look inside an object. An alternative to using Reflections™ is to parse through the byte codes representing the object.

No fields may exist in the object class because schema map object 126 has finished processing all fields of the entity or one of its superclasses or dependent classes. The processing is performed recursively. At step 164, schema map object 126 determines if it is presently processing a superclass as opposed to the entity or a dependent class. If it is not processing a superclass, and the entity class has no more fields, then it can be inferred that all field processing for any superclasses has been completed, and the process continues at step 188, as described below. If it is processing a superclass, then it can be inferred that (sub)classes exist below this superclass that have yet to be processed. Therefore, at step 168, the process returns from the recursive call.

If schema map object 126 determined at step 162 that fields to be processed exist, at step 170, it invokes a method to get one of the field description objects. Schema map object 126 then invokes a method on the field description object that returns an object describing any field modifier that the field may have. Schema map object 126 invokes another method on this object to determine if the current field object has a STATIC field modifier or a TRANSIENT field modifier. Static and transient fields are not persisted. Therefore, at step 172, schema map object returns to step 162 if the field modifier is STATIC and, at step 174, schema map object 126 returns to step 162 if the field modifier is TRANSIENT. If the field is neither static nor transient, at step 176, schema map object 126 invokes methods on the field description object to get the name and the type of the field. At step 178, schema map object 126 determines if the type is a dependent or a handle. If the type is neither a dependent nor a handle, at step 180, schema map object 126 determines if the type is a primitive type.

If the type is a dependent or a handle, at step 179, schema map object 126 recursively calls the method beginning at step 142 to process it. If the type is primitive, the field is to be stored in a column declared to be of the same or equivalent type as the field. At step 186, schema map object 126 creates an object pair consisting of a C++ field object and a C++ column object. The field object includes a method that communicates data between the Java™ field and a correspondingly typed database column. The column object is used to buffer this streamed data. The column object also stores the field name. Processing then continues at step 162, described above.

If the type is neither a dependent nor a handle nor a primitive type, then it represents a data structure that cannot be readily stored in a correspondingly typed field. Such types include but are not limited to the Java™ types VECTOR and HASHTABLE. At step 184, schema map object 126 creates an object pair consisting of a C++ field object and a C++ column object. The column object is provided with a field declared of type to receive an array of bytes representing a streamed object. The field object includes a method that communicates data in streamed format between the Java™ field and a corresponding database column. The column object is used to buffer this streamed data. The column object also stores the field name. Processing then continues at step 164, described above.

If processing is not currently at a superclass, then it can be inferred that the field references an entity field. Thus, at step 188, schema map object 126 invokes a method on the field description object that returns an object describing class modifiers. At step 190, schema map object 126 invokes another method on this object to determine if the class modifier is ABSTRACT. An abstract class cannot be instantiated. Therefore, the entity is to be streamed. If the class is abstract, at step 192, schema map object 126 deletes any field object and column object pairs already created for the dependent. At step 194, schema map object 126 creates another object pair consisting of a C++ field object and a C++ column object. The column object is provided with a field declared of type to receive an array of bytes representing a streamed object. The field object includes a method that communicates data in streamed format between the Java™ field and a corresponding database column. The column object is used to buffer this streamed data. The column object also stores the field name. Processing then continues at step 196, as it does if the class is not abstract.

At step 196, it is determined whether it is the entity itself that is currently being processed. If the entity is not currently being processed, at step 197, processing returns from the recursive call. If the entity is currently being processed, processing continues at step 202.

At that point, all fields of the entity class, its superclasses and dependents have been processed. All of the fields have been processed into pairs of C++ field objects and column objects, beginning with (see FIG. 5) field object 138 and column object 140, created in response to the first field processed, and ending with field object 198 and column object 200, created in response to the last field processed, and including all of the pairs in between, as indicated by the ellipses (" . . . ").

At step 202, schema map object 126 forms column names. In accordance with a suitable convention, columns names are selected that uniquely identify each column in the order the corresponding entity or dependent field was processed. A preferred convention appends a unique prefix to the field name to form the column name. The prefixes for the entity's fields may follow this pattern: "A__", . . . "Z__", "A1__", . . . , "A9__", "B1__", . . . , "B9__", . . . "Z1__", . . . , "Z9__". The prefixes for a dependent's fields may be formed by appending a prefix following the same pattern to a prefix of the dependent field in the containing entity or dependent. For example, if an entity has five fields, the third being a dependent, and the dependent has two fields, the resulting columns would have the following prefixes: "A__", "B__", "CA__", "CB__", "D__", "E__".

At step 204, schema map object 126 causes a table to be created in the database by invoking a C++ native method. The native method causes ODBC driver/manager 112 (FIG. 5) to issue the appropriate SQL statements to the database to create a table having the above-described column names. The native method uses the data types indicated by the column objects to configure the SQL data types of the columns. The schema map object methods terminate at that point, and control returns to connection object 117 and container object 116, which initiated the creation of a schema map.

Figure 8:
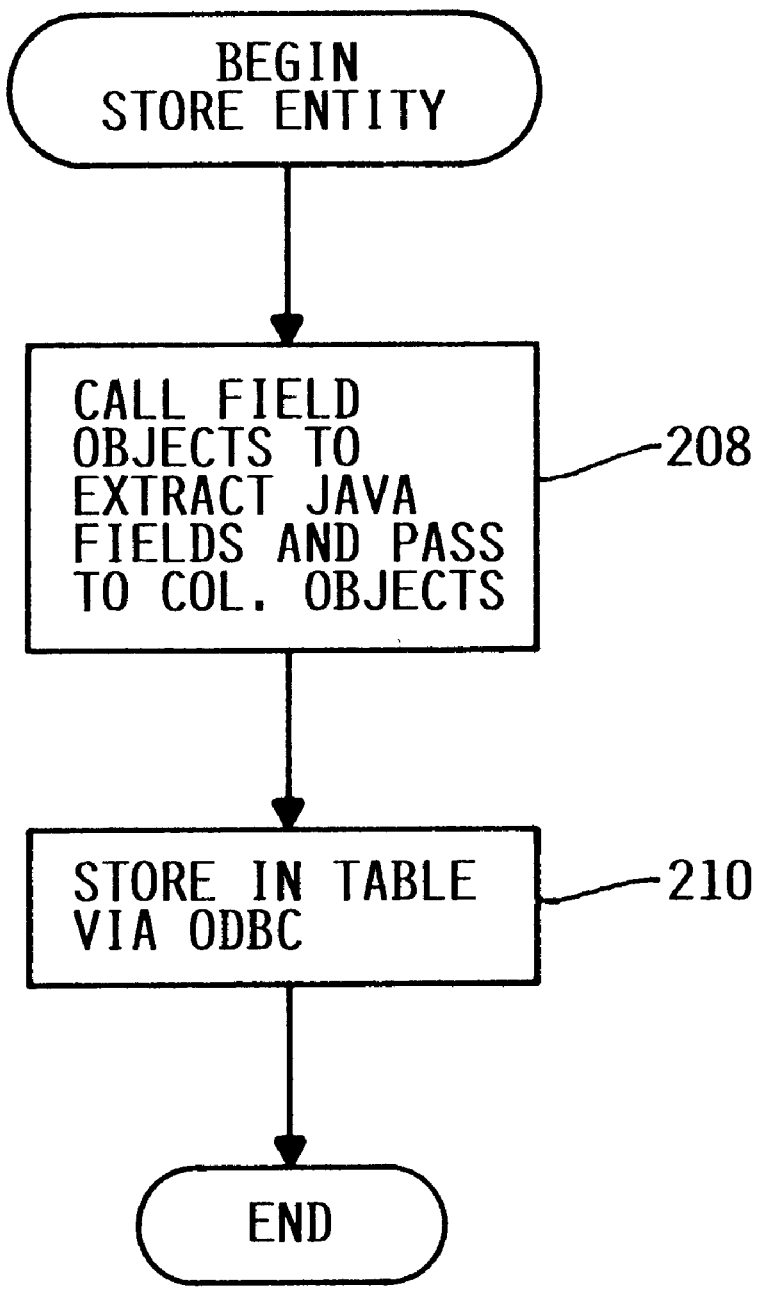
FIG. 8 is a flow diagram illustrating storing an object in a database table.

Returning to FIG. 6, if the database operation is a store operation, as indicated by step 206, connection object 117 (FIG. 5) invokes a store or update method on the appropriate schema map object at step 208. FIG. 8 illustrates the store method. At step 210, the schema map object invokes native methods on each C++ field object to extract data from the corresponding field of the Java™ object and pass the data to the corresponding C++ column object. As mentioned above, an advantage of using a native method to extract the data is that a native method can access private fields of a Java™ object. The column objects function as buffers. At step 210, the schema map object invokes methods on the column objects to communicate with ODBC driver/manager 112 (FIG. 5). ODBC driver/manager 112 issues appropriate SQL statements to store the contents of the buffer objects in their corresponding columns in the database table.

Figure 9:
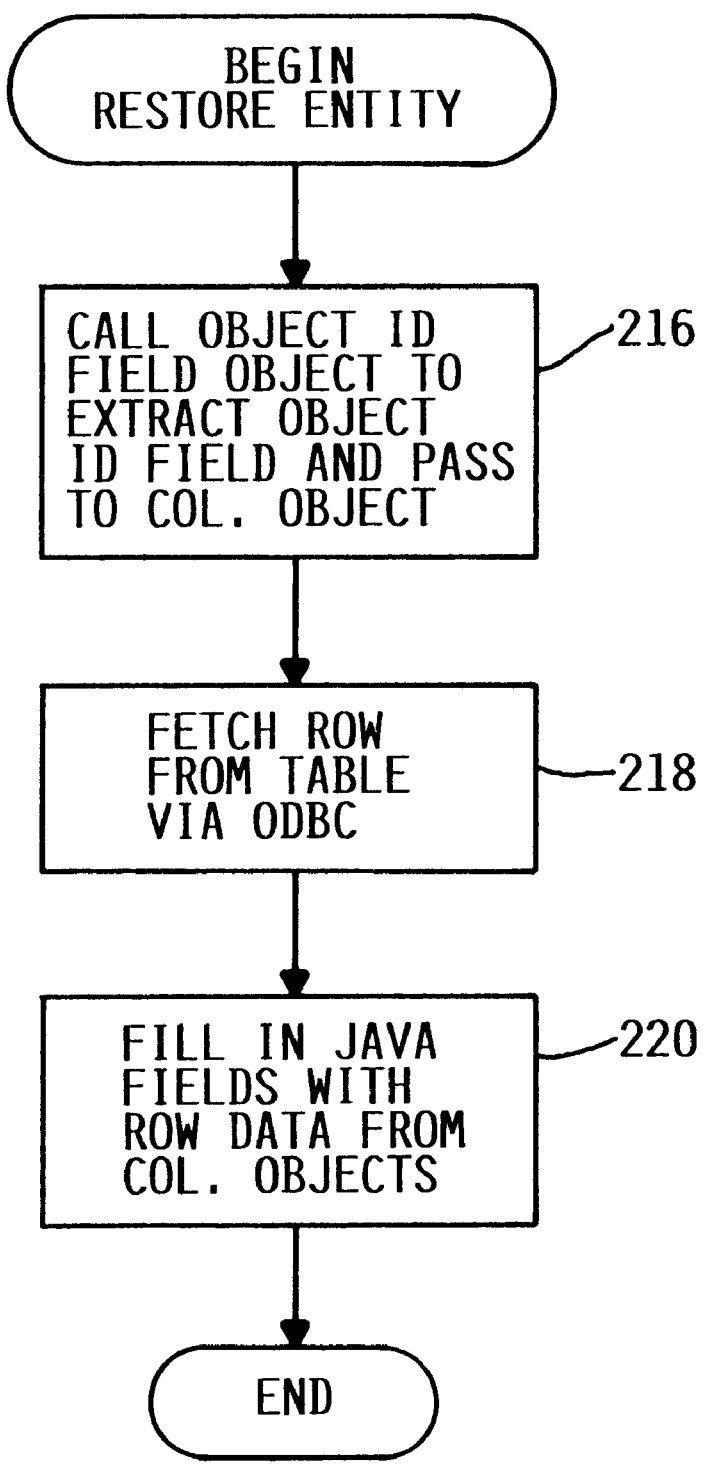
FIG. 9 is a flow diagram illustrating restoring an object from a database table.

Returning to FIG. 6, if the database operation is a restore operation, as indicated by step 212, connection object 117 (FIG. 5) invokes a restore method on the appropriate schema map object at step 214. FIG. 9 illustrates the restore method. At step 216, the schema map object invokes a method on the C++ field object representing the primary key, i.e., the object identifier, to extract data from the object identifier field of the entity's handle and pass the data to the corresponding C++ column object. At step 218, the schema map object invokes a method on the column object to communicate with ODBC driver/manager 112 (FIG. 5). ODBC driver/manager 112 issues appropriate SQL statements to fetch the row of the table using the object identifier data as a primary key. The row data are buffered in the corresponding column objects. At step 220, the schema map object invokes methods on the field objects to pass the data from the column objects to the corresponding fields of the entity.

Figure 10:
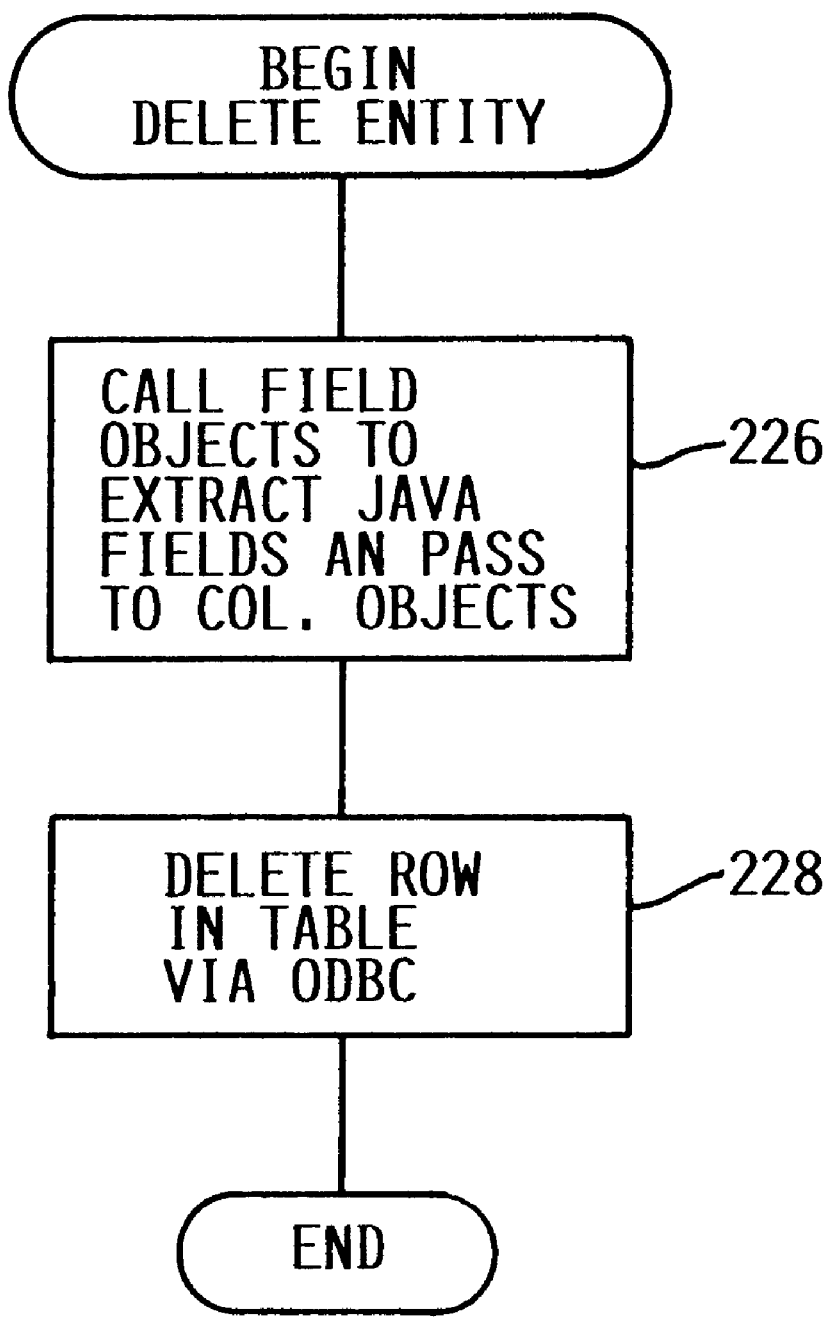
FIG. 10 is a flow diagram illustrating deleting an object from a database table.

Returning again to FIG. 6, if the database operation is a delete operation, as indicated by step 222, connection object 117 (FIG. 5) invokes a delete method on the appropriate schema map object at step 224. FIG. 10 illustrates the delete method. At step 226, the schema map object invokes a method on the C++ field object representing the primary key, i.e., the object identifier, to extract data from the object identifier field of the entity's handle and pass the data to the corresponding C++ column object. At step 228, the schema map object invokes a method on the column object to communicate with ODBC driver/manager 112 (FIG. 5). ODBC driver/manager 112 issues appropriate SQL statements to delete the row of the table using the object identifier data as a primary key.

As described above, aspects of the present invention pertain to a method and system embodied in a standalone, distributed, or other computer system. Nevertheless, the invention may also be embodied as a computer program product for use with a computer system. The program code defining the schema map constructor and the schema map objects themselves can be delivered to a computer system via a variety of signal-bearing media, which may include both recordable-type media and transmission-type media. Examples of recordable-type media include, but are not limited to: (a) information permanently stored on non-writeable storage media (e.g., read-only memory devices within a computer, such as a read-only portion of memory 96 in FIG. 5); and (b) alterable information stored on writeable storage media (e.g., floppy disks within a media drive such as disk drive 100 in FIG. 5). Examples of transmission-type media include conventional computer networks such as network link 104 (FIG. 5), as well as telephone networks, cable television networks, satellite broadcast networks, other wireless communication systems, and combinations thereof. Therefore, it should be understood that such signal-bearing media, when carrying computer readable instructions that direct the method functions of the present invention, represent alternative embodiments of the present invention.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A computer-implemented method for persisting an object in a relational database at an application program run-time, the method comprising the steps of:

determining fields of said object;

creating in a relational database a row corresponding to said object and one or more columns corresponding to said fields;

creating a schema map object, said schema-map object defining a mapping between said fields of said object and said columns;

unencapsulating said object to read values of said fields; and storing said values of said fields in said columns to which said fields are mapped in accordance with said schema map object.

2. The computer-implemented method recited in claim 1, wherein said step of determining fields of said object comprises the step of obtaining a field name, a field type, and a class name of each field.

3. The computer-implemented method recited in claim 1, wherein said step of determining fields of said object comprises the step of referencing a class object of which said object is an instance.

4. The computer-implemented method recited in claim 3, wherein said step of determining fields of said object comprises the step of invoking reflections methods on said class object.

5. The computer-implemented method recited in claim 1, wherein said step of unencapsulating said object comprises the steps of:

said schema map object calling a native method; and said native method reading each field, including private fields.

6. The computer-implemented method recited in claim 5, wherein said native method is written in a language other than a language in which said object is written that can access private fields of said object.

7. The computer-implemented method recited in claim 1, further comprising the steps of:

creating in said relational database an object identifier column designated as a primary key;

determining an object identifier associated with said object, said object identifier uniquely identifying said object against all other objects in a framework; and storing said object identifier in said object identifier column.

8. The computer-implemented method recited in claim 7, wherein said step of determining an object identifier associated with said object comprises the step of reading an object identifier field of a handle referencing said object.

9. The computer-implemented method recited in claim 1, further comprising the steps of:

determining whether any of said fields is declared to be of a predetermined data type; and streaming all fields of said object to a single column if any field is declared to be of said predetermined type.

10. The computer-implemented method recited in claim 9, wherein said type is selected from the group consisting of: vector and hashtable.

11. The computer-implemented method recited in claim 1, further comprising the steps of:

identifying any fields of said object representing a contained object;

determining fields of said contained object;

creating one or more columns corresponding to said fields of said contained object, said schema-map object defining a mapping between each field of said contained object and one of said columns;

unencapsulating said contained object to read values of said fields of said contained object; and storing said values of said fields of said contained object in said columns to which said fields are mapped in accordance with said schema map object.

12. The computer-implemented method recited in claim 11, further comprising the steps of:

determining whether any of said fields of said contained object is declared to be of a predetermined data type; and streaming all fields of said contained object to a single column if any field is declared to be of said predetermined type.

13. The computer-implemented method recited in claim 12, wherein said type is selected from the group consisting of: vector and hashtable.

14. The computer-implemented method recited in claim 1, further comprising the steps of:

determining whether any of said fields of said object represents an embedded handle referencing another object; and streaming all fields of said embedded handle to a single column.

15. A computer-implemented method for persisting an object in a relational database at an application program run-time, the method comprising the steps of:

referencing a class object of which said object is an instance to determine fields of said class object;

creating in a relational database a row corresponding to said object and one or more columns corresponding to said fields;

creating a schema map object, said schema-map object defining a mapping between said fields of said object and said columns;

said schema map object calling a native method;

said native method reading each field, including private fields of said object; and storing said values of said fields in said columns to which said fields are mapped in accordance with said schema map object.

16. A program product for use in a computer system, said program product for persisting an object in a relational database, said computer program product comprising a signal-bearing medium carrying thereon:

a schema map constructor defining a schema map object having a method for determining fields of said object, a method for initiating creation in a relational database a row corresponding to said object and one or more columns corresponding to said fields, and a method for initiating storage of values read from said fields in said columns;

a native interface; and a native method for unencapsulating said object to read said values of said fields.

17. The program product recited in claim 16, wherein said schema map object creates in said relational database an object identifier column designated as a primary key, determines an object identifier associated with said object, said object identifier uniquely identifying said object against all other objects in a framework, and initiates storage of said object identifier in said object identifier column.

18. The program product recited in claim 17, wherein said schema map object reads an object identifier field of a handle referencing said object.

19. The program product recited in claim 16, wherein said schema map object determines whether any of said fields is declared to be of a predetermined data type and initiates streaming of all fields of said object to a single column if any field is declared to be of said predetermined type.

20. The program product recited in claim 19, wherein said type is selected from the group consisting of: vector and hashtable.

21. The program product recited in claim 16, wherein:

said schema map object identifies any fields of said object representing a contained object, determines fields of said contained object, initiates creation of one or more columns corresponding to said fields of said contained object, and initiates storage of values of said fields of said contained object in said columns; and said native method unencapsulates said contained object to read values of said fields of said contained object.

22. The program product recited in claim 21, wherein said schema map object determines whether any of said fields of said contained object is declared to be of a predetermined data type and streams all fields of said contained object to a single column if any field is declared to be of said predetermined type.

23. The program product recited in claim 22, wherein said type is selected from the group consisting of: vector and hashtable.

24. The program product recited in claim 16, wherein said schema map object determines whether any of said fields of said object represents an embedded handle referencing another object and streams all fields of said embedded handle to a single column.

25. A system for persisting an object in a relational database at an application program run-time, comprising:

a relational database;

a container object for referencing said object in response to said application program completing a transaction; and a schema map constructor defining a schema map object having a method for determining fields of said object, a method for initiating creation in a relational database a row corresponding to said object and one or more columns corresponding to said fields, a method for unencapsulating said object to determine values of said fields, and a method for initiating storage of values read from said fields in said columns.

26. The system recited in claim 25, wherein said schema map object comprises:

a native interface; and a native method for unencapsulating said object to read said values of said fields.

27. The system recited in claim 25, wherein said schema map object creates in said relational database an object identifier column designated as a primary key, determines an object identifier associated with said object, said object identifier uniquely identifying said object against all other objects in a framework, and initiates storage of said object identifier in said object identifier column.

28. The system recited in claim 27, wherein said schema map object reads an object identifier field of a handle referencing said object.

29. The system recited in claim 25, wherein said schema map object determines whether any of said fields is declared to be of a predetermined data type and initiates streaming of all fields of said object to a single column if any field is declared to be of said predetermined type.

30. The system recited in claim 29, wherein said type is selected from the group consisting of: vector and hashtable.

31. The system recited in claim 25, wherein:

said schema map object identies any fields of said object representing a contained object, determines fields of said contained object, initiates creation of one or more columns corresponding to said fields of said contained object, and initiates storage of values of said fields of said contained object in said columns; and said native method unencapsulates said contained object to read values of said fields of said contained object.

32. The system recited in claim 31, wherein said schema map object determines whether any of said fields of said contained object is declared to be of a predetermined data type and streams all fields of said contained object to a single column if any field is declared to be of said predetermined type.

33. The system recited in claim 32, wherein said type is selected from the group consisting of: vector and hashtable.

34. The system recited in claim 25, wherein said schema map object determines whether any of said fields of said object represents an embedded handle referencing another object and streams all fields of said embedded handle to a single column.

* * * * *